US011981859B2

(12) United States Patent
Pisklak

(10) Patent No.: US 11,981,859 B2
(45) Date of Patent: May 14, 2024

(54) CARBON DIOXIDE ENHANCED CEMENT

(71) Applicant: Halliburton Energy Services, Inc., Houston, TX (US)

(72) Inventor: Thomas Jason Pisklak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/209,916

(22) Filed: Jun. 14, 2023

(65) Prior Publication Data

US 2023/0323185 A1    Oct. 12, 2023

Related U.S. Application Data

(62) Division of application No. 17/505,217, filed on Oct. 19, 2021, now abandoned.

(51) Int. Cl.
| | |
|---|---|
| *C09K 8/467* | (2006.01) |
| *C04B 14/04* | (2006.01) |
| *C04B 28/04* | (2006.01) |
| *C04B 40/02* | (2006.01) |
| *E21B 33/14* | (2006.01) |
| *E21B 41/00* | (2006.01) |

(52) U.S. Cl.
CPC ............ *C09K 8/467* (2013.01); *C04B 14/043* (2013.01); *C04B 28/04* (2013.01); *C04B 40/0231* (2013.01); *E21B 33/14* (2013.01); *E21B 41/0064* (2013.01)

(58) Field of Classification Search
CPC ....... C09K 8/467; C04B 14/043; C04B 28/04; C04B 40/0231; E21B 33/14; E21B 41/0064
See application file for complete search history.

(56) References Cited

U.S. PATENT DOCUMENTS 5,820,670 A * 10/1998 Chatterji ............... C04B 24/124
106/737
10,961,428 B1    3/2021 Pisklak et al.
(Continued)

FOREIGN PATENT DOCUMENTS

| WO | 2016061251 A1 | 4/2016 |
| WO | 2020102724 A1 | 5/2020 |
| WO | 2020206011 A1 | 10/2020 |

OTHER PUBLICATIONS

Smigelskyte, Agne, "Synthesis, Properties, and Application of Rankinite in the Production of CO2 Cured Concrete," Kaunas University of Technology, 2019, 108 pages.
(Continued)

*Primary Examiner* — Crystal J Lee
(74) *Attorney, Agent, or Firm* — Conley Rose, P.C.; Rodney B. Carroll

(57) ABSTRACT

A cement composition including a hydraulic cement material, a latent-hydraulic cement material, and a non-hydraulic cement material. Also provided is a method including combining, at a jobsite, the cement composition comprising the hydraulic cement material, the latent-hydraulic cement material, and the non-hydraulic cement material with water to provide a cement slurry, and allowing the cement slurry to harden in the presence of carbon dioxide ($CO_2$) to provide a hardened cement.

20 Claims, 4 Drawing Sheets

(56) References Cited

U.S. PATENT DOCUMENTS

| | | | |
|---|---|---|---|
| 11,001,742 B2 | 5/2021 | Pisklak et al. | |
| 2010/0135882 A1* | 6/2010 | Constantz | C01B 32/60 |
| | | | 423/234 |
| 2014/0060389 A1 | 3/2014 | Chatterji et al. | |
| 2020/0399178 A1* | 12/2020 | Schumacher | C04B 24/04 |
| 2021/0253932 A1* | 8/2021 | Pisklak | C09K 8/428 |
| 2022/0332655 A1* | 10/2022 | Keulen | C04B 28/18 |
| 2023/0124103 A1 | 4/2023 | Pisklak | |

OTHER PUBLICATIONS

Hewlett, Peter C. "Lea's Chemistry of Cement and Concrete," 1988, Fourth Edition, 3 pages, Elsevier.

Omosebi, O.A. et al., "Mechanisms of Cement Degradation in HPHT Carbonic Acid Environment," SPE International Conference on Oilfield Chemistry, Apr. 2017, SPE-184567, 21 pages, Society of Petroleum Engineers.

Huijgen, W.J.J. et al., "Mechanisms of Aqueous Wollastonite Carbonation as a Possible CO2 Sequestration Process," Chemical Engineering Science, 2006, 36 pages.

Nelson, Erik B. et al., "Well Cementing," 2006, Second Edition, 3 pages, Schlumberger.

Foreign Communication from Related Application—International Search Report and Written Opinion of the International Searching Authority, International Application No. PCT/US2022/040036, dated Nov. 23, 2022, 11 pages.

* cited by examiner

CARBON DIOXIDE ENHANCED CEMENT

CROSS-REFERENCE TO RELATED APPLICATIONS

This application is a divisional of and claims priority to U.S. patent application Ser. No. 17/505,217 filed Oct. 19, 2021, published as U.S. Patent Application Publication No. 2023/0124103 A1, and entitled "Carbon Dioxide Enhanced Cement" which is hereby incorporated by reference in its entirety.

STATEMENT REGARDING FEDERALLY SPONSORED RESEARCH OR DEVELOPMENT

Not applicable.

TECHNICAL FIELD

The present disclosure relates generally to wellbore cementing. More specifically, the present disclosure relates to carbon sequestration via wellbore cementing. Still more specifically, the present disclosure relates to sequestration of carbon dioxide via formation of a carbon dioxide enhanced cement.

BACKGROUND

In cementing operations, such as well construction and remedial cementing, cement slurries are commonly utilized. Cement slurries may be used in primary cementing operations whereby pipe strings, such as casing and liners, are cemented in wellbores. In a typical primary cementing operation, a cement slurry may be pumped into an annulus between the exterior surface of the pipe string disposed therein and the walls of the wellbore (or a larger conduit in the wellbore). The cement slurry may set in the annular space, thereby forming an annular sheath of hardened, substantially impermeable material (e.g., a cement sheath) that may support and position the pipe string in the well bore and may bond the exterior surface of the pipe string to the wellbore walls (or the larger conduit). Among other things, the cement sheath surrounding the pipe string should function to prevent the migration of fluids in the annulus, as well as protecting the pipe string from corrosion. Cement slurries also may be used in remedial cementing methods, such as in squeeze cementing for sealing voids in a pipe string, cement sheath, gravel pack, subterranean formation, and the like.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

Disclosed herein are carbon dioxide ($CO_2$) enhanced cement compositions (hereinafter, "cement compositions"), cement slurries comprising the cement compositions, and methods for preparing and utilizing such cement compositions and cement slurries. This disclosure thus provides low carbon footprint cements and utilizes $CO_2$ to produce a chemical resistant and strength enhanced cement.

Figure 1:
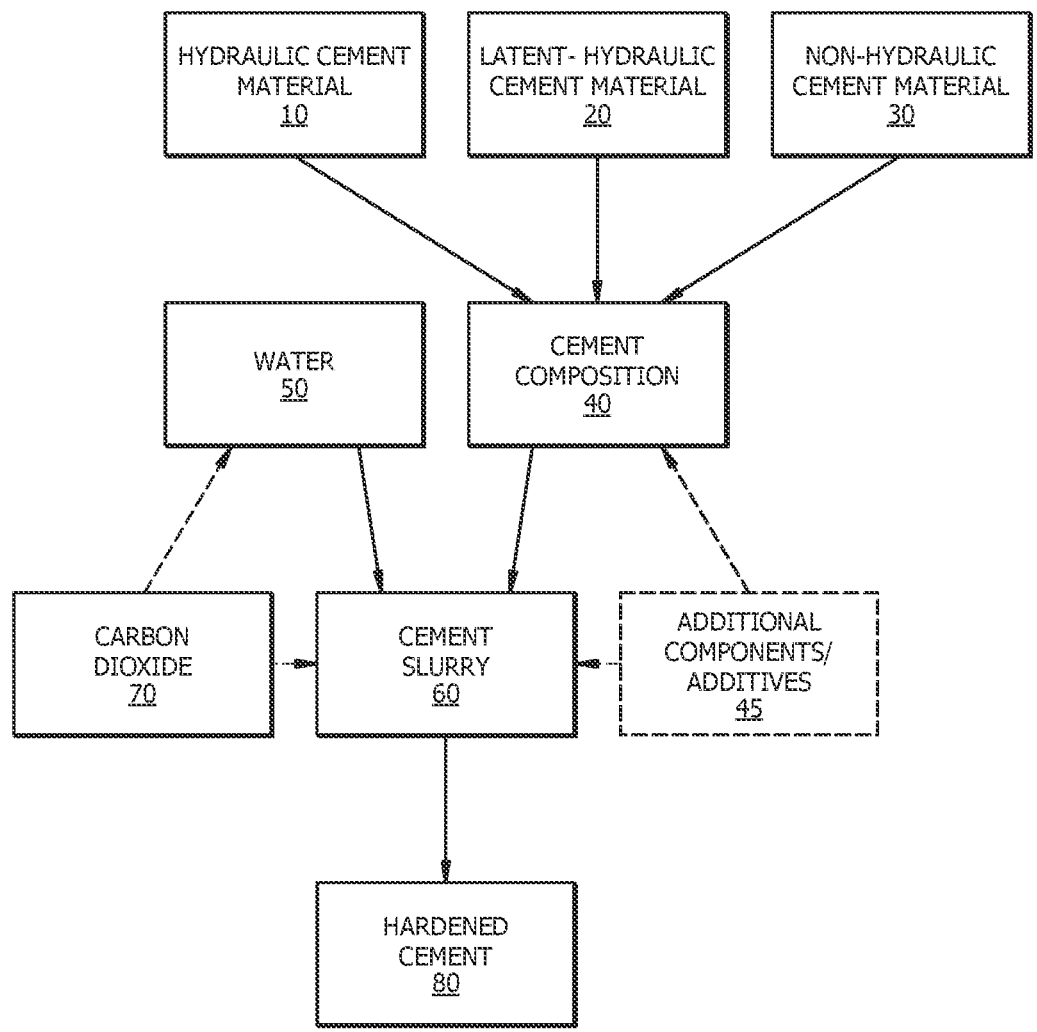
FIG. 1 is a schematic of a cement composition and a cement slurry comprising the cement composition, according to embodiments of this disclosure.

With reference to FIG. 1, which is a schematic of a cement composition 40 and a cement slurry 60, according to this disclosure, a cement composition 40 of this disclosure comprises: a hydraulic cement material 10; a latent-hydraulic cement material 20; and a non-hydraulic cement material 30. A cement slurry 60 according to this disclosure can comprise the cement composition 40, water 50, and optionally one or more additional components (or "additives"), as described hereinbelow. Although depicted in FIG. 1 with the components of the cement composition 40 (i.e., the hydraulic cement material 10, the latent-hydraulic cement material 20, and the non-hydraulic cement material 30) being combined to form the cement composition 40 prior to the cement composition 40 being combined with the water 50 to provide the cement slurry 60, as detailed further hereinbelow, in embodiments, the hydraulic cement material 10, the latent-hydraulic cement material 20, the non-hydraulic cement material 30, the water 50, and the optional additional components 45 can be combined in any order to provide the cement slurry 60. In embodiments, $CO_2$ 70 is incorporated into the cement slurry 60, as described further hereinbelow. The cement slurry 60 hardens or "sets" to provide a hardened cement 80.

In embodiments, the cement composition 40 comprises from about 1 to about 98, from about 20 to about 80, or from about 40 to about 60 weight percent (wt %) of the hydraulic cement material, from about 1 to about 98, from about 10 to about 60, or from about 20 to about 40 wt % of the latent-hydraulic cement material, and/or from about 1 to about 98, from about 10 to about 60, or from about 20 to about 40 wt % of the non-hydraulic cement material, based on a total weight of the hydraulic cement material 10, the latent-hydraulic cement material 20, and the non-hydraulic cement material 30.

In embodiments, the hydraulic cement material 10 comprises Portland cement, the latent-hydraulic cement material 20 comprises a pozzolanic material, and an amount of the hydraulic cement material 10 and an amount of the latent-hydraulic cement material 20 are selected such that an amount of Portlandite (Ca(OH)$_2$) needed for reaction of the pozzolanic material is provided by the reaction of the hydraulic cement material 10.

As noted above, a cement composition 40 of this disclosure comprises a hydraulic cement material 10. A hydraulic cement material refers to a cement with the ability to set and to develop compressive strength through the addition of only water. In embodiments, the hydraulic cement material 10 can comprise Portland cement. When water is added to Portland cement (or other hydraulic cements) multiple chemical reactions occur or begin to occur, all of which play into the final properties of the set cement. Although the full mechanisms are not presented herein, the reactions depicted below in Equations 1-5 are representative of what occurs during the hydraulic setting reactions:

$$3CaO \cdot SiO_2 + xH_2O \rightarrow CaO_{1.7} \cdot SiO_2 \cdot xH_2O + 1.3Ca(OH)_2 \quad \text{(Eq. 1)}$$

$$2CaO \cdot SiO_2 + xH_2O \rightarrow CaO_{1.7} \cdot SiO_2 \cdot xH_2O + 0.3Ca(OH)_2 \quad \text{(Eq. 2)}$$

$$3CaO \cdot Al_2O_3 + xH_2O \rightarrow 3CaO \cdot Al_2O_3 \cdot xH_2O \quad \text{(Eq. 3)}$$

$$4CaO \cdot Al_2O_3 \cdot Fe_2O_3 + xH_2O \rightarrow 3CaO \cdot Al_2O_3 \cdot xH_2O + CaO \cdot Fe_2O_3 \quad \text{(Eq. 4)}$$

$$2(3CaO \cdot Al_2O_3) + 3CaSO_4 \cdot 2H_2O + 26H_2O \cdot 3CaO \cdot Al_2O_3 \cdot 3CaSO_4 \cdot 32H_2O \quad \text{(Eq. 5)}$$

The hydraulic cement can be included in the cement composition 40/cement slurry 60 as a source of hydroxide ions. Any of a variety of hydraulic cements may be suitable including those including calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, alumina based cements, silica cements, and any combination thereof. Examples of suitable Portland cements may include those classified as Classes A, B, C, G, or H cements according to American Petroleum Institute, API Specification for Materials and Testing for Well Cements, API Specification 10, Fifth Ed., Jul. 1, 1990. Additional examples of suitable Portland cements may include those classified as ASTM Type I, II, III, IV, or V.

The hydraulic cement material 10 may be included in the cement composition 40/cement slurry 60 in an amount (or concentration). The amount of the hydraulic cement material 10 may be selected, for example, to provide a particular compressive strength for the cement slurry 60 after setting (i.e., the hardened cement 80). The hydraulic cement material 10 may be included in an amount in a range of from about 1% to about 98% by weight of the cement composition 40. By way of example, the hydraulic cement material 10 may be present in an amount ranging between any of and/or including any of about 1%, about 5%, about 10%, about 20%, about 30%, about 40%, about 50%, about 60%, about 70%, 80%, 90%, 95%, or 98% by weight of the cement composition 40. In embodiments, the hydraulic cement material 10 may be present in an amount in a range of from about 1% to about 98% by weight of the cement composition 40 and, alternatively, from about 20% to 80%, or from about 40% to 60% by weight of the cement composition 40. The hydraulic cement material 10 may be included in an amount in a range of from about 20% to about 80% by weight of the cement slurry 60. By way of example, the hydraulic cement material 10 may be present in an amount ranging between any of and/or including any of about 1%, about 5%, about 10%, about 20%, about 30%, about 40%, about 50%, about 60%, about 70%, or about 80% by weight of the cement slurry 60. In embodiments, the hydraulic cement material 10 may be present in an amount in a range of from about 25% to about 75% by weight of the cement slurry 60 and, alternatively, from about 40% to 60% by weight of the cement slurry 60.

As noted hereinabove, cement composition 40 comprises a latent-hydraulic cement material. A latent hydraulic cement material refers to a cement that will not react in the presence of water alone, but also requires a source of calcium hydroxide. In embodiments, the latent-hydraulic cement material 20 comprises a pozzolanic material. Pozzolanic reactions are another type of cementitious reaction. Unlike Portland cement however, pozzolanic reactions are considered to be latent-hydraulic reactions. Pozzolanic materials include any natural or artificial (industrial) siliceous or silicoaluminous material that, when in the presence of hydrated lime (also called Ca(OH)$_2$, hydrated lime, lime, or Portlandite) and water will react to produce strength developing insoluble compounds, as seen in the reaction of Equation 6, similar to those formed during the hydration of hydraulic (e.g., Portland) cement.

$$Ca(OH)_2 + H_4SiO_4 \rightarrow Ca^{2+} + H_2SiO_4^{2-} + 2H_2O \rightarrow CaH_2SiO_4 \cdot 2H_2O \quad \text{(Eq. 6)}.$$

In Eq. (6), the silicic acid, H$_4$SiO$_4$, (which is equivalent to SiO$_2$·2H$_2$O) represents the silica obtained from pozzolanic materials. Some natural sources of pozzolanic materials are volcanic materials, such as volcanic glasses, clays, and zeolites and also diatomaceous earths. Industrial pozzolans, also sometimes called artificial pozzolans, come from several sources such as partially calcining natural clays, shales, and siliceous rocks (i.e. metakaolin); the burning of coal (fly ashes); from silicon metal production (silica fume); and from steel production (granulated blast furnace slag). The latent-hydraulic cement material 20 can comprise a pozzolanic composition such as fly ash, silica fume, metakaolin, volcanic glasses, other natural glasses or combinations thereof, for example, to prevent cement compressive. An example of a suitable pozzolan may include fly ash. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof.

In some examples, the latent-hydraulic cement material 20 may be present in the cement composition 40 in an amount in the range of from about 1% to about 98% by weight of the cement composition 40 (e.g., about 5%, about 10%, about 15%, about 20%, about 25%, about 30%, about 35%, about 40%, about 45%, about 50%, about 55%, etc.). In some examples, the latent-hydraulic cement material 20 may be present in the cement composition 40 in an amount in the range of from about 10% to about 60%, or from about 20% to about 40% by weight of the cement composition 40. In some examples, the latent-hydraulic cement material 20 may be present in the cement slurry 60 in an amount in the range of from about 1% to about 60% by weight of the cement slurry 60 (e.g., about 5%, about 10%, about 15%, about 20%, about 25%, about 30%, about 35%, about 40%, about 45%, about 50%, about 55%, etc.). In some examples, the latent-hydraulic cement material 20 may be present in the cement slurry 60 in an amount in the range of from about 1% to about 35% by weight of the cement slurry 60. In some examples, the latent-hydraulic cement material 20 may be present in the cement slurry 60 in an amount in the range of from about 1% to about 10% by weight of the cement slurry 60. Alternatively, the amount of the latent-hydraulic cement material 20 may be expressed by weight of dry solids. For example, the latent-hydraulic cement material 20 may be present in the cement slurry 60 in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the latent-hydraulic cement material 20 may be present in the cement slurry 60 in an amount in the range of from about 1% to about 20% and, alternatively, from about 1% to about 10% by weight of dry solids.

The latent hydraulic cement material 20 can include fly ash. A variety of fly ashes may be suitable, including fly ash classified as Class C or Class F fly ash according to American Petroleum Institute, ASTM C618-15, "Standard Specification for Coal Fly Ash and Raw or Calcined Natural Pozzolan for Use in Concrete" published 2015. Where used, the fly ash generally may be included in the cement slurry 60 in an amount desired for a particular application. Where present, the fly ash may be present in the cement composition 40 in an amount in the range of from about 1% to about 98% by weight of the cement composition 40 (e.g., about 5%, about 10%, about 15%, about 20%, about 25%, about 30%, about 35%, about 40%, about 45%, about 50%, about 55%, etc.). In some examples, the fly ash may be present in the cement composition 40 in an amount in the range of from about 1% to about 35% by weight of the cement composition 40. In some examples, the fly ash may be present in the cement composition 40 in an amount in the range of from about 1% to about 10% by weight of the cement composition 40. In some examples, the fly ash may be present in the cement slurry 60 in an amount in the range of from about 1% to about 60% by weight of the cement slurry 60 (e.g., about 5%, about 10%, about 15%, about 20%, about 25%, about 30%, about 35%, about 40%, about 45%, about 50%, about 55%, etc.). In some examples, the fly ash may be present in the cement slurry 60 in an amount in the range of from about 1% to about 35% by weight of the cement slurry 60. In some examples, the fly ash may be present in the cement slurry 60 in an amount in the range of from about 1% to about 10% by weight of the cement slurry 60. Alternatively, the amount of the fly ash may be expressed by weight of dry solids. For example, the fly ash may be present in an amount in a range of from about 1% to about 99% by weight of dry solids (e.g., about 1%, about 5%, about 10%, about 20%, about 300, about 40%, about 50%, about 60%, about 70%, about 80%, about 90%, about 99%, etc.). In some examples, the fly ash may be present in an amount in the range of from about 1% to about 20% and, alternatively, from about 1% to about 10% by weight of dry solids.

In embodiments, the latent-hydraulic cement material 20 comprises a pozzolanic material comprising a natural pozzolanic material chosen from volcanic materials (e.g., volcanic glasses), clays, zeolites, or diatomaceous earth, and/or an artificial pozzolan produced by: calcining of natural clay, shale, and/or siliceous rocks (e.g., metakaolin), burning of coal (e.g., fly ash), silicon metal production (e.g., silica fume), or steel production (e.g., granulated blast furnace slag).

The latent-hydraulic cement material 20 can include slag. Slag is generally a granulated, blast furnace by-product from the production of cast iron including the oxidized impurities found in iron ore. The slag may be included in examples of the cement composition 40/cement slurry 60 in an amount suitable for a particular application. Where used, the slag may be present in an amount in the range of from about 0.1% to about 98% by weight of the cement composition 40. For example, the slag may be present in an amount ranging between any of and/or including any of about 0.1%, about 10%, about 20%, about 45 30%, or about 40% by weight of the cement composition 40. Where used, the slag may be present in an amount in the range of from about 0.1% to about 40% by weight of the cement slurry 60. For example, the slag may be present in an amount ranging between any of and/or including any of about 0.1%, about 10/o, about 20%, about 45 30%, or about 40% by weight of the cement slurry 60.

In embodiments, the latent-hydraulic cement material 20 includes volcanic glass or shale in an amount sufficient to provide the desired compressive strength, density, and/or cost. A variety of shales are suitable, including those including silicon, aluminum, calcium, and/or magnesium. Examples of suitable shales include vitrified shale and/or calcined shale. Where used, the volcanic glass or shale may be present in an amount in the range of from about 0.1% to about 98% by weight of the cement composition 40. For example, the volcanic glass or shale may be present in an amount ranging between any of and/or including any of about 0.1%, about 10%, about 20%, about 30%, or about 40% by weight of the cement composition 40. Where used, the volcanic glass or shale may be present in an amount in the range of from about 0.1% to about 40% by weight of the cement slurry 60. For example, the volcanic glass or shale may be present in an amount ranging between any of and/or including any of about 0.1%, about 10%, about 20%, about 30%, or about 40% by weight of the cement slurry 60.

As noted hereinabove, a cement composition 40 of this disclosure comprises a non-hydraulic cement material 30. Another type of cementitious reaction is known as a non-hydraulic reaction, i.e. water is not consumed during the reaction to form cementitious materials. Examples of this type of cement utilize materials such as wollastonite ($CaSiO_3$), parawollastonite ($CaSiO_3$), pseudowollastonite ($Ca_3Si_3O_9$), rankinite ($Ca_3Si_2O_7$), and other calcium metasilicates which, in the presence of liquid water and $CO_2$, will react with $CO_2$ to form a set cement. The reaction of Eq. (7) and Eq. (8) below are representative of what occurs during such non-hydraulic reactions:

$$CaO \cdot SiO_2 + CO_2 + H_2O \rightarrow CaCO_3 + SiO_2 + H_2O^* \qquad (Eq.\ 7)$$

$$3CaO \cdot 2SiO_2 + 3CO_2 + H_2O \rightarrow 3CaCO_3 + 2SiO_2 + H_2O^* \qquad (Eq.\ 8)$$

As seen in Eq. (7) and Eq. (8), water is not consumed in the non-hydraulic reactions. These non-hydraulic reactions produce calcium carbonate and amorphous silica as the reaction products and are often referred to as "mineral carbonation" reactions. Furthermore, the reaction products, combine in such a way as to produce a set cement body with reasonable compressive strength. This type of cement, produced from calcium silicate phases has been shown to be thermodynamically stable to temperatures in excess of 500° C. In addition to providing enough strength to form a capable oil well cement through the uptake of $CO_2$, the high temperature resistance and stability offer an effective way to safely and permanently sequester $CO_2$.

In embodiments, the non-hydraulic cement material 20 comprises a mineral carbonation cement material. The mineral carbonation cement material can comprise a calcium metasilicate. The calcium metasilicate can comprise wollastonite ($CaSiO_3$), parawollastonite ($CaSiO_3$), pseudowollastonite ($Ca_3Si_3O_9$), rankinite ($Ca_3Si_2O_7$), or a combination thereof.

The non-hydraulic cement material 30 may be included in an amount in a range of from about 1% to about 98% by weight of the cement composition 40. By way of example, the non-hydraulic cement material 30 may be present in an amount ranging between any of and/or including any of about 1%, about 5%, about 10%, about 20%, about 30%, about 40%, about 50%, about 60%, about 70%, 80%, 90%, 95%, or 98% by weight of the cement composition 40. In embodiments, the non-hydraulic cement material 30 may be present in an amount in a range of from about 10% to about 60% by weight of the cement composition 40 and, alternatively, from about 20% to 40% by weight of the cement composition 40. The non-hydraulic cement material 30 may be included in an amount in a range of from about 1% to about 80% by weight of the cement slurry 60. By way of example, the non-hydraulic cement material 30 may be present in an amount ranging between any of and/or including any of about 1%, about 5%, about 10%, about 20%, about 30%, about 40%, about 50%, about 60%, about 70%, or about 80% by weight of the cement slurry 60. In embodiments, the non-hydraulic cement material 30 may be present in an amount in a range of from about 25% to about 75% by weight of the cement slurry 60 and, alternatively, from about 40% to 60% by weight of the cement slurry 60.

By utilizing the cement composition 40 in cement slurry 60, a combination of all three disparate reaction types, Hydraulic (Portland cement), Latent-Hydraulic (Pozzolanic cement) and Non-Hydraulic (mineral carbonation) work together to form a highly chemical resistant and strong (e.g., oil well) cement. Due to the synergistic reactions of all three types, the product cement (i.e., the hardened cement 80 produced from setting of cement slurry 60), has several desirable properties for an (e.g., oil well) cement, such as, without limitation, chemical resistance, low permeability, enhanced strength, and the ability to permanently sequester $CO_2$.

Other desirable properties enabled via the herein disclosed combination of a hydraulic cement material 10, the latent-hydraulic cement material 20, and the non-hydraulic cement material 30 in cement composition 40 and cement slurry 60 include a reduced carbon footprint as compared to conventional oil well cements due to two factors: (1) the use of pozzolanic materials, which have a low to zero carbon footprint, to replace a portion of the Portland cement; and (2) the ability of the calcium metasilicate to uptake and permanently sequester $CO_2$, thereby, preventing the $CO_2$ from entering the Earth's atmosphere and acting as a greenhouse gas.

As seen in Eq. (1) and Eq. (2), Portland cement produces calcium hydroxide (also known as Portlandite) during the hydration of the calcium silicates ($C_2S$ and $C_3S$). This excess Portlandite may be undesirable due to the fact that it forms long, hexagonal crystals which are subsequently embedded in the CSH matrix of the cured, hardened cement. When these crystals come into contact with an acid, such as carbonic, sulfuric, or hydrochloric acid, an acid-base reaction occurs between the Portlandite (base) and the acid, forming calcium carbonate. Through a complex mechanism, this further leads to soluble species being formed (e.g., $CaHCO_3$) which then dissolve, leaving the cement highly porous and weaker than before the reaction. Addition of pozzolanic materials to the Portland cement, as per this disclosure, can help prevent these reactions from occurring and ultimately protect the cement from chemical degradation. The pozzolanic material requires calcium hydroxide to react and form CSH, and this calcium hydroxide can be obtained from the hydraulic cementitious reactions of Eq. (1) and Eq. (2). Once the pozzolanic material reacts with the calcium hydroxide, as per Eq. (6), the acid-base degradation reaction becomes limited or can no longer occur.

Additionally, by including the non-hydraulic cement material that reacts according to Eq. (7) and Eq. (8), in the cement composition 40, the degradation reaction is further inhibited by the uptake of $CO_2$ by the calcium metasilicate. For example, there can be no $CO_2$ included in the mix water 50, such that the calcium metasilicate would not react until $CO_2$ was encountered from the environment. This uptake of $CO_2$ can lower the concentration of carbonic acid in the immediate vicinity of the cement and reduce the amount of acid available to react with base. All three of these mechanisms, when combined, produce a much more chemical resistant cement than any one alone. Accordingly, a hardened cement 80 produced via the cement slurry 60 comprising the cement composition 40, water 50, and optional additional components 45, can have a chemical resistance greater than that of an otherwise same cement absent one or more of the hydraulic cement material 10, the latent-hydraulic cement material 20, or the non-hydraulic cement material 30.

As noted hereinabove, the formation of Portlandite during the Portland cement reactions (e.g., of Eq. (1)-Eq. (5)) can lead to increased permeability through dissolution by acid. It can also lead to increased permeability by leaching of the Portlandite. In the leaching process, no acid is required, but the $Ca^{2+}$ can leach into the surrounding water due to an ionic concentration gradient. Although slower than the dissolution process, leaching also leads to degradation of the cement through increased porosity and permeability. Including latent-hydraulic cement material (e.g., pozzolanic materials) with hydraulic cement materials (e.g., Portland cement), as described herein can reduce these effects and contribute to lower permeability through the same mechanisms described above, i.e. uptake of excess Portland and the formation of extra CSH.

Adding a non-hydraulic cement material (e.g., a mineral carbonation capable material) can further reduce the permeability of the cement through reactions with carbonic acid and the subsequent formation of $CaCO_3$ which fills pore space. Accordingly, a hardened cement 80 produced via the cement slurry 60 comprising the cement composition 40, water 50, and optional additional components 45, can have a permeability that is less than that of an otherwise same cement absent one or more of the hydraulic cement material 10, the latent-hydraulic cement material 20, or the non-hydraulic cement material 30.

Combining all three components of the cement composition 40 (i.e., the hydraulic cement material, the latent-hydraulic cement material 20, and the non-hydraulic cement material 30 and the corresponding three reaction types produces a hardened cement 80 with low permeability and consequently higher chemical resistance, which leads to a highly effective barrier, e.g., for oil wells.

The inclusion of latent-hydraulic cement material 20 (e.g., pozzolanic materials) with hydraulic cement material 10 (e.g., Portland cement), can increase the overall strength of the resulting hardened cement 80. However, such cements, along with pure Portland cements, are still susceptible to chemical degradation. Degradation of the cement not only occurs through dissolution of the Portlandite but also through dissolution of the CSH gel which makes up the solid matrix of the set cement.

Adding a non-hydraulic cement material 30 (e.g., a mineral carbonation capable material), as described herein, into the cement blend of the latent-hydraulic cement material 20 (e.g., pozzolanic materials) and the hydraulic cement material 10 (e.g., Portland cement), produces a cement which is not only resistant to chemical attack, but is able to increase in compressive strength due to a chemical attack. This occurs due to the formation of $CaCO_3$ via the reactions of Eq. (7) and Eq. (8) when in the presence of carbonic acid. The calcium carbonate fills any available pore space, thereby reducing the porosity and increasing the compressive strength of the resulting hardened cement 80. Alternatively, as detailed herein, $CO_2$ can be added (e.g., to the mix water 50) to force all three reaction types to occur simultaneously and produce a strength enhanced cement. Accordingly, a hardened cement 80 produced via the cement slurry 60 comprising the cement composition 40, water 50, and optional additional components 45, can have a strength that is greater than that of an otherwise same cement absent one or more of the hydraulic cement material 10, the latent-hydraulic cement material 20, or the non-hydraulic cement material 30. The strength can be quantified using compressive strength values, for example methods found in API 10B-2. For a given cement, compressive strength (and other properties) depend on multiple factors, such as temperature, pressure, time, slurry density, slurry water content, additive type and content, etc.

In some examples, the cement slurry 60 may set to have a desirable compressive strength. Compressive strength is generally the capacity of a material or structure to withstand axially directed pushing forces. The compressive strength may be measured at a specified time after the cement slurry 60 has been maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength can be calculated from the failure load divided by the cross-sectional area resisting the load and is reported in units of pound-force per square inch (psi). Non-destructive methods may employ a USA™ ultrasonic cement analyzer, available from Fann Instrument Company, Houston, Tex. Compressive strength values may be determined in accordance with API RP 10B-2, Recommended Practice for Testing Well Cements, First Edition, July 2005. By way of example, the cement slurry may develop a 24-hour compressive strength in the range of from about 50 psi (345 kPa) to about 5000 psi (34474 kPa), alternatively, from about 100 psi (689 kPa) to about 4500 psi (31026 kPa), or alternatively from about 500 psi (3447 kPa) to about 4000 psi (27578 kPa). In some examples, the cement slurry may develop a compressive strength in 24 hours of at least about 50 psi (345 kPa), at least about 100 psi (689 kPa), at least about 500 psi (3447 kPa), or more. In some examples, the compressive strength values may be determined using destructive or non-destructive methods at a temperature ranging from 100° F. (38° C.) to 200° F. (93° C.).

In embodiments, once the cement slurry 60 has set, the hardened cement 80 comprises: from about 5 to about 60, from about 40 to about 50, from about 45 to about 50, and/or greater than or equal to about 5, 10, 15, 20, 25, 30, 35, 40, 45, 50, 55, or 60 vol % $CO_2$ entrained per $m^3$ of the hardened cement 80 at conditions under which the cement slurry 60 hardens. In embodiments, the hardened cement 80 is downhole.

The cement composition 40 and/or the cement slurry 60 can further comprising one or additional components or additives 45. The additives 45 can include one or more retarders, accelerators, support materials, aggregates, viscosifiers, suspending aids, weighting agents, lightweight additives, gas-generating additives, mechanical-property-enhancing additives, lost-circulation materials, filtration-control additives, fluid-loss-control additives, defoaming agents, foaming agents, thixotropic additives, or combinations thereof.

In embodiments, the latent-hydraulic cement material 20 comprises a pozzolanic material, and the one or more accelerators comprise calcium chloride ($CaCl_2$), sodium chloride (NaCl), sodium sulfate ($Na_2SO_4$), or a combination thereof.

Also disclosed herein is a cement slurry 60 comprising the cement composition 40 and water 50. As noted hereinabove the cement composition 40, the cement slurry 60, or both can further include one or more additional cement components or "additives".

Exemplary such additional cement components 45 and amounts of the water 50 and one or more additional cement components 45 will be described hereinbelow. Although a variety of additives 45 are described hereinbelow, additives 45 other than or in addition to those described herein can be utilized in the cement slurry 60 according to this disclosure.

A design consideration for a cement slurry may be cement slurry 60 density. Providing a cement slurry 60 with a density within a safe operational envelope may be important to ensure that the set cement (e.g., the hardened cement 80) provides effective zonal isolation. Most subterranean formations may have an upper density limit defined by the fracture gradient of the subterranean formation. If a cement slurry 60 has a high density whereby the pressure of the cement column on the subterranean formation exceeds the fracture gradient, the cement slurry 60 may cause the formation to fracture, leading to loss of cement slurry 60 and potential formation damage. Even if the cement slurry 60 does not fracture the formation, providing a cement slurry 60 with too high density may cause cement slurry 60 to leak off into the formation which may lead to formation damage and additional cost of cement to "make up" the cement lost. However, a lower density limit may be defined by the formation fluid pressure at the wellbore walls, for example. The cement slurry 60 generally must have sufficient density to minimize or prevent formation fluids from entering the wellbore before the cement has set. Without sufficient density, the formation fluids may flow into the cement column which may weaken the hardened cement 80.

Cement slurry 60 density may be controlled by adjusting the amount of water in the cement slurry 60. For example, a cement slurry 60 may be produced with relatively higher amounts of water if a lower density cement slurry 60 is desired or relatively lower amounts of water if a higher density cement slurry 60 is desired. The cement slurry 60 may also include lightweight cement additives such as hollow beads or other relatively low-density additives that may aid in lowering density or heavy cement additives such as weighting agents or other relatively high-density additives which may increase density. However, adjusting cement slurry 60 density by changing water content or adding cement additives may affect other properties of the cement slurry 60 such as compressive strength, thickening time, rheology, fluid loss, free fluid, and fluid stability, among others. Furthermore, some additives may be incompatible with each other or require excessive water to hydrate.

A cement slurry 60 generally should have a water content that does not result in undesirable free water or separation of water from the bulk cement slurry 60. Free water may be an aqueous phase that separates from a cement slurry 60 or mixture of fluids. In cementing operations, free water is generally undesirable since channels can form through the set cement, providing potential gas migration paths. When processing reservoir fluids, the water that separates easily under gravity separation is known as free water. In some cases, additional water may be locked in an emulsion, contributing to the aqueous phase but not available as free water. API RP 10B-2, *Recommended Practice for Testing Well Cements*, First Edition, July 2005 provides methods to determine free water for a cement slurry. Free water may cause problems in wellbore cementing, especially in deviated wellbores such as horizontal wellbores. Water that separates from the bulk cement slurry 60 may migrate to the top of a conduit to be cemented resulting in pockets where the cement slurry 60 is not in contact with the subterranean formation. These pockets of free water may cause problems such as loss of zonal isolation, conduit corrosion, wellbore collapse, and other problems. It is therefore typically preferred that cement slurries 60 have little to no free water present in the set composition.

A common and inexpensive method to decrease cement slurry 60 density may be to add additional water during preparation of the cement slurry 60, as water is typically less dense than other components in the cement slurry 60. The additional water may allow the cement slurry 60 to be prepared to lower densities but may also result in free water separating from the cement slurry 60 as the cement slurry 60 is introduced into a wellbore and allowed set.

The water 50 in the cement slurry 60 can be from any source provided that it does not contain an excess of compounds that may undesirably affect other components in the cement slurry 60. For example, a cement slurry 60 may include fresh water, salt water such as brine (e.g., saturated saltwater produced from subterranean formations) or seawater, or any combination thereof. Salt water generally may include one or more dissolved salts therein and may be saturated or unsaturated as desired for a particular application. Seawater or brines may be suitable for use in some examples of the cement slurry 60. Further, the water 50 may be present in an amount sufficient to form a pumpable slurry. Generally, the water 50 may be added to the cement slurry 60 in any desired concentration, including at a point in a range of from about 10% to about 80% by weight of the cement slurry 60. Alternatively, the water may be present in the cement slurry 60 at a point in a range of from an amount of about 10% to about 30% by weight of the cement slurry 60, at a point in a range of from about 30% to about 50% by weight of the cement slurry 60, at a point in a range of from about 50% to about 60% by weight of the cement slurry 60, at a point in a range of from about 60% to about 70% by weight of the cement slurry 60, at a point in a range of from about 70% to about 80% by weight of the cement slurry 60, or any points therebetween.

The cement slurry 60 can have a density suitable for a particular application. By way of example, the cement slurry 60 may have a density at a point in a range of from about 4 pounds per gallon ("lb/gal") (479 kg/m$^3$) to about 20 lb/gal (2396 kg/m$^3$). Alternatively, the cement slurry 60 may have a density at a point in a range of from about 4 lb/gal (479 kg/m$^3$) to about 7 lb/gal (839 kg/m$^3$), at a point in a range of from about 7 lb/gal (839 kg/m$^3$) to about 10 (1198 kg/m$^3$), at a point in a range of from about 10 lb/gal (1198 kg/m$^3$) to about 13 lb/gal (1558 kg/m$^3$), at a point in a range of from about 13 lb/gal (1558 kg/m$^3$), to about 16 lb/gal (1917 kg/m$^3$), at a point in a range of from about 16 lb/gal to about 20 lb/gal, or any points therebetween. As discussed above, the density of cement slurry 60 may be an important design factor as the density range of cement may be limited by the formation properties. One method to control density may be to increase the fraction of water 50 included in the cement slurry 60. However, increasing water fraction generally leads to a hardened cement 80 with a lower compressive strength and increased free water which may be unsuitable for some applications.

In some examples, the cement slurry 60 may further include a lightweight additive. The lightweight additive may be included to reduce the density of examples of the cement slurry 60. For example, the lightweight additive may be used to form a lightweight cement slurry 60, for example, having a density of less than about 13 lb/gal (1558 kg/m$^3$). The lightweight additive typically may have a specific gravity of less than about 2.0. Examples of suitable lightweight additives may include sodium silicate, hollow microspheres, gilsonite, perlite, and combinations thereof. Where used, the lightweight additive may be present in an amount in the range of from about 0.1% to about 20% by weight of the cement slurry 60, for example. In alternative examples, the lightweight additive may be present in an amount in the range of from about 1% to about 10% by weight of the cement slurry 60.

Some examples of the cement slurry 60 may include silica sources; for example, crystalline silica and/or amorphous silica. Crystalline silica is a powder that may be included in examples of the cement slurry, for example, to prevent cement compressive strength retrogression. Amorphous silica is a powder that may be included in examples of the cement slurry as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Examples including a silica source may utilize the silica source as needed to enhance compressive strength or set times.

The cement slurry 60 may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. In some instances, the kiln dust may be included in the cement slurry as a source of hydroxide ions. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. In some examples, the kiln dust may be present in the cement slurry in an amount in the range of from about 1% to about 60% by weight of the cement slurry 60 (e.g., about 5%, about 10%, about 15%, about 20%, about 25%, about 30%, about 35%, about 40%, about 45%, about 50%, about 55%, etc.).

The cement slurry 60 may further include a set retarder. A broad variety of set retarders may be suitable for use in the cement slurry 60. For example, the set retarder may include phosphonic acids, such as ethylenediamine tetra(methylene phosphonic acid), diethylenetriamine Penta(methylene phosphonic acid), lignosulfonates, such as sodium lignosulfonate, calcium lignosulfonate, salts such as stannous sulfate, lead acetate, monobasic calcium phosphate, organic acids, such as citric acid, tartaric acid, cellulose derivatives such as hydroxyl ethyl cellulose (HEC) and carboxymethyl hydroxyethyl cellulose (CMHEC), synthetic co- or ter-polymers including sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement slurry 60 in an amount sufficient to delay the setting for a desired time. In some examples, the set retarder may be present in the cement slurry 60 in an amount in the range of from about 0.01% to about 10% by weight of the cement slurry 60. In specific examples, the set retarder may be present in an amount ranging between any of and/or including any of about 0.01%, about 0.1%, about 1%, about 2%, about 4%, about 6%, about 8%, or about 10% by weight of the cement slurry 60.

The cement slurry 60 may further include a set accelerator. Set accelerators may be included in the cement slurry 60 to, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. In some examples, the set accelerator may be present in the cement slurry 60 in an amount in the range of from about 0.01% to about 10% by weight of the cement slurry 60. In specific examples, the set accelerator may be present in an amount ranging between any of and/or including any of about 0.01%, about 0.1%, about 1%, about 2%, about 4%, about 6%, about 8%, or about 10% by weight of the cement slurry 60.

The cement slurry 60 may further include a dispersant. Examples of suitable dispersants include, without limitation, sulfonated-formaldehyde-based dispersants (e.g., sulfonated acetone formaldehyde condensate) and polycarboxylated ether dispersants. In some examples, a dispersant may be included in the cement slurry 60 in an amount in the range of from about 0.01% to about 5% by weight of the cement slurry 60. In specific examples, the dispersant may be present in an amount ranging between any of and/or including any of about 0.01%, about 0.1%, about 0.5%, about 1%, about 2%, about 3%, about 4%, or about 5% by weight of the cement slurry 60.

The cement slurry 60 may further include a free water control additive. As used herein, the term "free water control additive" refers to an additive included in a liquid for, among other things, reducing or preventing the presence of free water in the cement slurry 60. Free water control additive may also reduce or prevent the settling of solids. Examples of suitable free water control additives include, but are not limited to, gum (e.g., diutan gum), bentonite, amorphous silica, hydroxyethyl cellulose, and combinations thereof. The free water control additive may be provided as a dry solid in some embodiments. Where used, the free water control additive may be present in cement slurry 60 in an amount in the range of from about 0.1% to about 16% by weight of dry solids, for example. In alternative embodiments, the free water control additive may be present in cement slurry 60 in an amount in the range of from about 0.1% to about 2% by weight of dry solids.

The cement slurry 60 may further include a fluid-loss-control additive. A fluid-loss-control additive may decrease the volume of fluid that is lost to the subterranean formation. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers including a backbone of lignin or lignite and pendant groups including at least one member selected from the group consisting of 2-acrylamido-2-methylpropanesulfonic acid, acrylonitrile, and N,N-dimethylacrylamide, for example.

The cement slurry 60 can include a source of hydroxide ions. The source of hydroxide ions can be any source of hydroxide ions suitable for use in a cement slurry 60. Some examples of sources of hydroxide ions may be compounds which release hydroxide when mixed with water, such as calcium hydroxide, or compounds which react with water or other compounds and release hydroxide ions such as Portland cement. Other sources of hydroxide ions may include, but are not limited to, hydrated lime, cement kiln dust, and lime kiln dust, for example.

The source of hydroxide ions may include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement slurry 60, for example, to form a hydraulic composition with a pozzolan or silica source. For example, the hydrated lime may be included in a pozzolan or silica source-to hydrated-lime weight ratio of about 10:1 to about 1:1 or a ratio of about 3:1 to about 5:1. Where present, the hydrated lime may be included in the cement slurry 60 in an amount at a point in a range of from about 1% to about 40% by weight of the cement slurry 60, for example. In some examples, the hydrated lime may be present in an amount ranging between any of and/or including any of about 1%, about 10%, about 20%, about 30%, or about 40% by weight of the cement slurry 60.

Other additives (e.g., suitable for use in subterranean cementing operations) may also be included in examples of the cement slurry 60. Examples of such additives include, but are not limited to weighting agents, gas-generating additives, mechanical-property-enhancing additives, lost-circulation materials, filtration-control additives, defoaming agents, thixotropic additives, and combinations thereof. In examples, one or more of these additives may be added to the cement slurry prior to the placement of the cement slurry (e.g., into a wellbore).

Also provided herein is a method of producing a hardened cement 80 at a jobsite. Such a method will now be described with reference to FIG. 2, which is a schematic flow diagram of a method I, according to embodiments of this disclosure. Method I comprises combining, at a jobsite, the cement composition 40 with water 50 to provide a cement slurry 60, as indicated at 105, and allowing the cement slurry 60 to harden in the presence of $CO_2$ 70 to form the hardened cement 80, as indicated at 110. In embodiments, the resulting hardened cement 80 has a strength (e.g., a compressive strength) and/or chemical resistance (e.g., a resistance to acid) that is greater than and/or a permeability that is less than an otherwise same hardened cement under the same conditions that is produced in the absence of the hydraulic cement material 10, the latent-hydraulic cement material 20, or the non-hydraulic cement material 30.

The presence of the $CO_2$ 70 can be provided by (a) utilizing water 50 comprising carbonated water (e.g., produced with $CO_2$ 70 produced at the jobsite at which Method I is performed or another jobsite), and combining the carbonated water and the cement composition 40 to provide the cement slurry 60; and/or (b) combining $CO_2$ 70 (e.g., produced with $CO_2$ 70 produced at the jobsite or another jobsite) with the cement composition 40 and the water 50 to provide the cement slurry 60. Alternatively or additionally, as described hereinbelow, the presence of $CO_2$ can be provided by positioning a cement composition downhole, where it is contacted with $CO_2$, reacts (e.g., with calcium metasilicate), and becomes sequestered in the hardened cement. The jobsite can be a wellsite. In embodiments, the carbon dioxide 70 is a component of an exhaust gas produced at the jobsite. The exhaust gas can be a product of combustion of a fuel, such as, natural gas, gasoline (petrol), diesel fuel, fuel oil, biodiesel, coal, or a combination thereof. In addition to $CO_2$, such an exhaust gas can further comprise nitrogen ($N_2$), carbon monoxide (CO), hydrogen sulfide ($H_2S$), water vapor, hydrocarbons $C_xH_y$ (or "HC"), nitrogen oxides ($NO_x$), sulfur oxides (SOx) particulate matter (soot), or a combination thereof. Accordingly, Method I can further comprise producing $CO_2$ 70, as indicated at 101 in FIG. 2, separating the $CO_2$ 70 from the exhaust gas, as indicated at 102, or both.

The hydraulic cement material 10, the latent-hydraulic cement material 20, and the non-hydraulic cement material 30 can be as described hereinabove. In embodiments, the hydraulic cement material 10 comprises Portland cement, the latent-hydraulic cement material 20 comprises a pozzolanic material, and/or the non-hydraulic cement material 30 comprises a mineral carbonation cement material.

Allowing the cement slurry 60 to harden in the presence of $CO_2$ 70 can further comprise incorporating $CO_2$ 70 into the cement slurry 60 by combining $CO_2$ 70 with the cement composition 40 and the water 50 to provide the cement slurry 60, carbonating the water 50 by combining the water 50 with $CO_2$ 70 before combining the cement composition 40 and the carbonated water 50 to provide the cement slurry 60, and/or placing the cement composition 40 at a location at which the cement composition 40 is exposed to $CO_2$ 70. Such will be described further hereinbelow with reference to FIG. 4.

Figure 3:
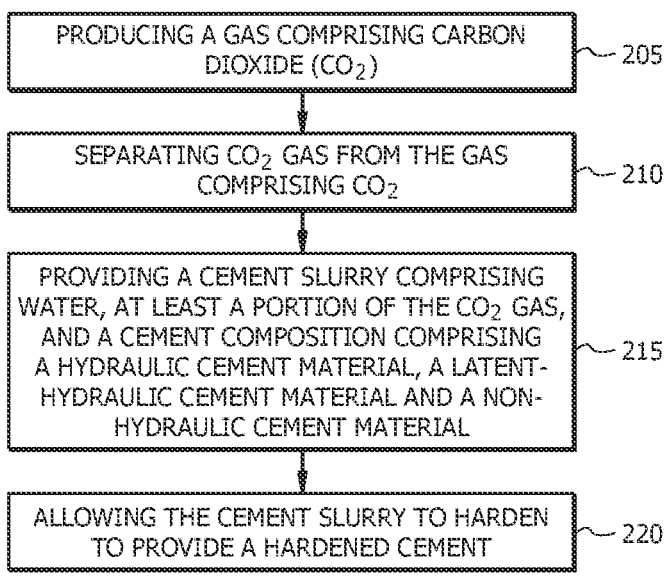
FIG. 3 is a schematic flow diagram of a method, according to embodiments of this disclosure.

Also disclosed herein is a method of sequestering $CO_2$. Such a method will now be described with reference to FIG. 3, which is a schematic flow diagram of a method IL, according to embodiments of this disclosure. As depicted in FIG. 3, method II comprises producing a gas comprising $CO_2$, as indicated at 205; separating $CO_2$ gas from the gas comprising $CO_2$ as indicated at 210; providing a cement slurry 60, as described hereinabove, comprising water 50, the cement composition 40 comprising the hydraulic cement material 10, the latent-hydraulic cement material 20, and the non-hydraulic cement material 30, and at least a portion of the $CO_2$ 70 gas, and allowing the cement slurry 60 to harden to provide a hardened cement 80, as indicated at 220.

Providing the cement slurry 60 at 215 can further comprise combining the water 50 and all or a portion of the at least the portion of the $CO_2$ 70 gas to provide a carbonated water and combining the carbonated water with the cement composition 40 to provide the cement slurry 60. This will be further described hereinbelow with reference to FIG. 4.

The gas comprising $CO_2$ can comprise an exhaust gas produced at a wellsite, such as described hereinabove.

Figure 5:
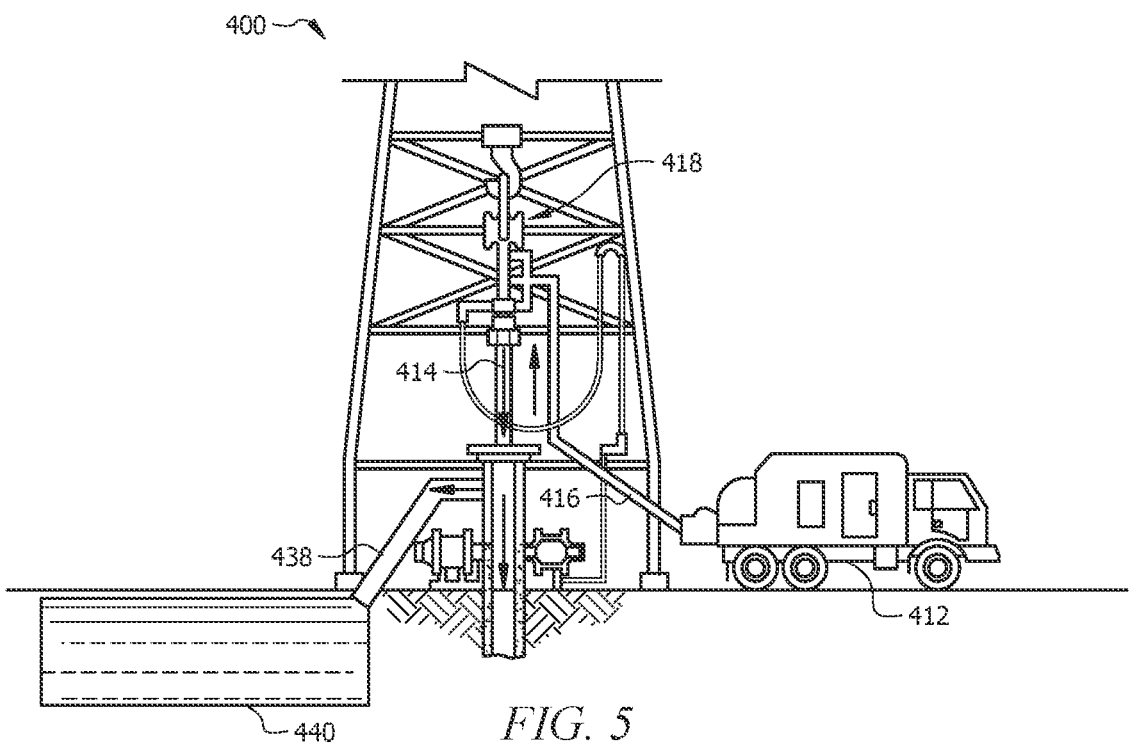
FIG. 5 is a schematic illustration of exemplary surface equipment that can be utilized in placement of a cement slurry comprising the cement composition to a final destination, such as a wellbore, according to embodiments of this disclosure.

In embodiments in which the jobsite is a wellsite, Method I/II can further comprise introducing (e.g., injecting) the cement slurry 60 downhole (e.g., via a wellbore or annulus, as described hereinbelow with reference to FIG. 5 and FIG. 6) during a cementing operation at the wellsite, prior to allowing the cement slurry 60 to harden in the presence of the $CO_2$ to provide the hardened cement 80.

The cementing operation can comprise any cementing operation. For example, the cementing operation can comprise a primary cementing operation, a remedial cementing operation (e.g., a squeeze cementing operation), a loss circulation operation, a plug and abandon operation, reverse cementing operations, or another downhole or above-ground cementing operation.

In embodiments, the cement slurry 60 shrinks by less than or equal to about 5, 4, 3, 2, 1, 0.5, or 0 volume percent (vol %) on hardening to provide the hardened cement 80.

As noted hereinabove, the cement slurry 60 disclosed herein may be used in a variety of subterranean operations, including primary and remedial cementing. The cement slurry 60 may be introduced into a wellbore and allowed to set therein (e.g., as described hereinbelow with reference to FIG. 5, which is a schematic illustration of an exemplary placement of a cement slurry into a wellbore annulus, according to embodiments of this disclosure). As used herein, introducing the cement slurry 60 into a subterranean formation includes introduction into any portion of the subterranean formation, including, without limitation, into a wellbore drilled into the subterranean formation, into a near wellbore region surrounding the wellbore, such as a subterranean formation, or into both. In primary cementing, the cement slurry 60 may be introduced into an annular space between a conduit located in a wellbore and the walls of a wellbore (and/or a larger conduit in the wellbore), wherein the wellbore penetrates the subterranean formation. The cement slurry 60 may be allowed to set in the annular space to form an annular sheath of hardened cement 80. The cement slurry 60 may form a barrier that prevents the migration of fluids in the wellbore. The cement slurry 60 may also, for example, support the conduit in the wellbore. In remedial cementing, a cement slurry 60 may be used, for example, in squeeze-cementing operations or in the placement of cement plugs. By way of nonlimiting example, the cement slurry may be placed in a wellbore to plug an opening (e.g., a void or crack) in the formation, in a gravel pack, in the conduit, in the cement sheath, and/or between the cement sheath and the conduit (e.g., a microannulus).

Figure 4:
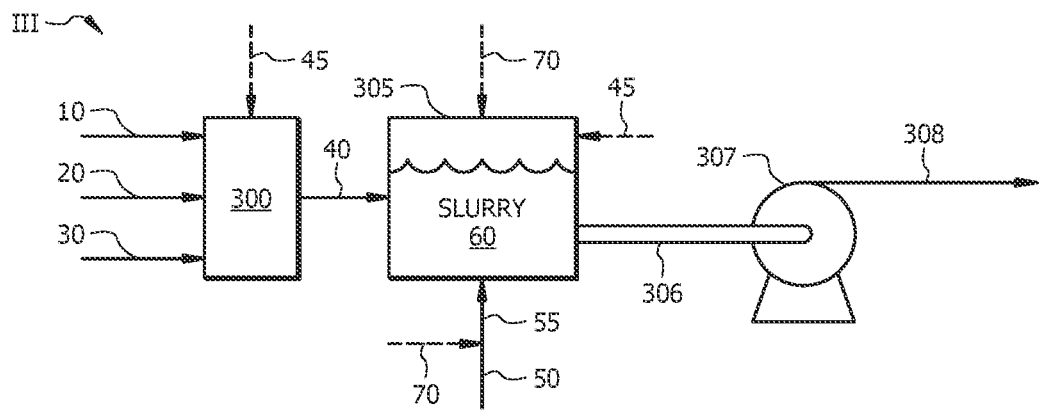
FIG. 4 is a schematic illustration of an exemplary system for the preparation and delivery of a cement slurry comprising the cement composition, according to embodiments of this disclosure.

As described further hereinbelow with reference to FIG. 4, the components of the cement slurry 60 may be combined in any order desired to form a cement slurry 60 that can be placed in a final destination (e.g., into a subterranean formation or another below ground or above ground location). In addition, the components of the cement slurry 60 may be combined using any mixing device compatible with the cement slurry 60, including a bulk mixer, for example. In one particular example, a cement slurry 60 may be prepared by dry blending the solid components of the cement composition 40 at a bulk plant, for example, and thereafter combining the dry blend cement composition 40 with water when desired for use. For example, a dry blend may be prepared that includes the dry cement components (e.g., the cement composition 40 and optionally dry additives 45). Liquid additives (if any) can be combined with the water before the water is combined with the dry components or added directly to a mixer tub.

The preparation of a cement slurry 60 in accordance with example embodiments will now be described with reference to FIG. 4, which is a schematic illustration of a system III for the preparation of a cement slurry 60 comprising cement composition 40 and subsequent delivery of the cement slurry 60 to a final destination at which the cement slurry 60 will be allowed to harden, for example, in a wellbore. The cement slurry 60 may be prepared according to any method disclosed herein such that the cement slurry 60 remains in a pumpable fluid state for an extended period of time. As shown, the cement slurry 60 may be mixed in mixing equipment 305, such as, without limitation, a jet mixer, re-circulating mixer, or a batch mixer, for example, and then pumped via pumping equipment 307 to a final destination, for example, a wellbore. In some embodiments, the mixing equipment 305 and the pumping equipment 307 may be disposed on one or more cement trucks.

One or more lines can be utilized to introduce water 50, cementitious materials (e.g., hydraulic cement material 10, latent-hydraulic cement material 20, non-hydraulic cement material 30, cement composition 40), and optionally additives 45 to mixer 305. In embodiments, the hydraulic cement material 10, the latent-hydraulic cement material 20, and the non-hydraulic cement material 30 can be combined, optionally with one or more of the additional components 45 (e.g., dry additives) for example in a mixer 300 to provide cement composition 40. Alternatively, one or more of the hydraulic cement material 10, the latent-hydraulic cement material 20, or the non-hydraulic cement material 30 can be introduced directly into mixer 305. The one or more additional cement components 45 can be added at any suitable point in system III, for example, into mixer 300 or mixer 305. From mixer 305, cement slurry 60 can be pumped via line 306 and pump 307 to a downstream destination (e.g., a wellbore) via a line 308.

Figure 2:
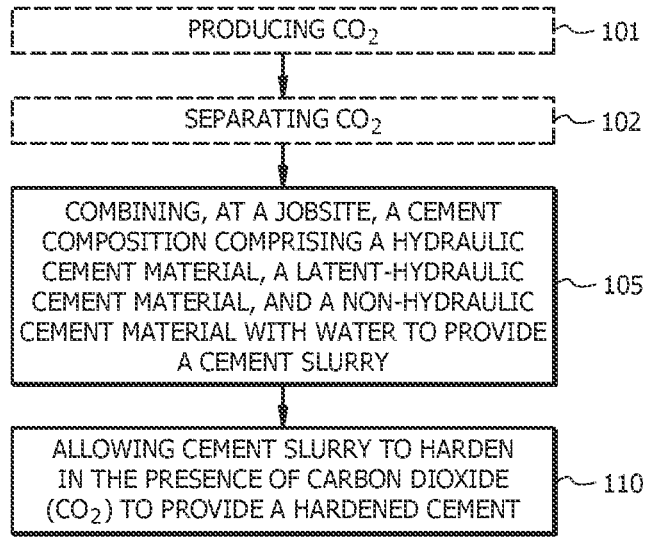
FIG. 2 is a schematic flow diagram of a method, according to embodiments of this disclosure.

As noted hereinabove, a method I/II of this disclosure can comprise allowing the cement slurry 60 to harden in the presence of $CO_2$ 70 to provide a hardened cement 80 (e.g., as depicted at 110 of FIG. 2 and 220 of FIG. 3, respectively). In embodiments of this disclosure, the presence of $CO_2$ can be provided by incorporating $CO_2$ 70 into the cement slurry 60 by combining $CO_2$ 70 with the cement composition 40 and the water 50 and optional additives 45 to provide the cement slurry 60. Alternatively or additionally, the presence of $CO_2$ 70 can be provided by incorporating $CO_2$ 70 into the cement slurry 60 by carbonating the water 50 to provide carbonated water 55 by combining the water 50 with $CO_2$ 70 before combining the cement composition 40 and the carbonated water 50, and optionally additives 45, to provide the cement slurry 60. Alternatively or additionally, the presence of $CO_2$ can be provided by placing the cement slurry 60 at a location at which the cement slurry 60 is exposed to $CO_2$ 70, for example as described hereinafter with regard to FIG. 5 and FIG. 6.

An example technique for placing the cement slurry 60 into a subterranean formation will now be described with reference to FIGS. 5 and 6. FIG. 5 is a schematic illustration of surface equipment 400 that may be used in placement of a cement slurry 60 in accordance with certain embodiments. It should be noted that while FIG. 5 generally depicts a land-based operation, those skilled in the art will readily recognize that the principles described herein are equally applicable to subsea operations that employ floating or sea-based platforms and rigs, without departing from the scope of the disclosure. As illustrated by FIG. 5, the surface equipment 400 may include a cementing unit 412, which may include one or more cement trucks. The cementing unit 412 may include mixing equipment 305 and pumping equipment 307 (e.g., as depicted in FIG. 4). The cementing unit 412 may pump cement slurry 60 through a feed pipe 416 and to a cementing head 418 which conveys the cement slurry 60 downhole.

Figure 6:
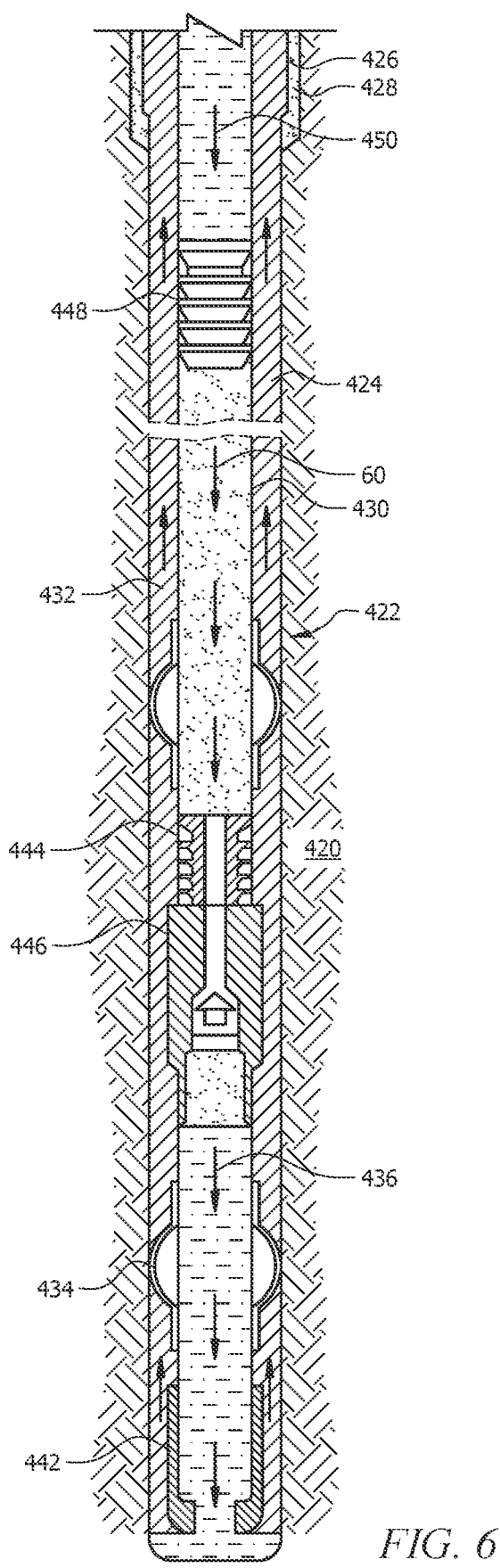
FIG. 6 is a schematic illustration of an exemplary placement of a cement slurry comprising the cement composition into a wellbore annulus, according to embodiments of this disclosure.

Turning now to FIG. 6, the cement slurry 60 may be placed into a subterranean formation 420 in accordance with example embodiments. As illustrated, a wellbore 422 may be drilled into the subterranean formation 420. While wellbore 422 is shown extending generally vertically into the subterranean formation 420, the principles described herein are also applicable to well bores that extend at an angle through the subterranean formation 420, such as horizontal and slanted wellbores. As illustrated, the wellbore 422 comprises walls 424. In the illustrated embodiment, a surface casing 426 has been inserted into the wellbore 422. The surface casing 426 may be cemented to the walls 424 of the wellbore 422 by cement sheath 428. In the illustrated embodiment, one or more additional conduits (e.g., intermediate casing, production casing, liners, etc.), shown here as casing 430 may also be disposed in the wellbore 422. As illustrated, there is a wellbore annulus 432 formed between the casing 430 and the walls 424 of the wellbore 422 and/or the surface casing 426. One or more centralizers 434 may be attached to the casing 430, for example, to centralize the casing 430 in the wellbore 422 prior to and during the cementing operation.

With continued reference to FIG. 6, the cement slurry 60 can be pumped down the interior of the casing 430. The cement slurry 60 can be allowed to flow down the interior of the casing 430 through a casing shoe 442 at the bottom of the casing 430 and up around the casing 430 into the wellbore annulus 432. The cement slurry 60 may be allowed to set in the wellbore annulus 432, for example, to form a cement sheath that supports and positions the casing 430 in the well bore 422. While not illustrated, other techniques may also be utilized for introduction of the cement slurry 60. By way of example, reverse circulation techniques may be used that include introducing the cement slurry 60 into the subterranean formation 420 by way of the wellbore annulus 432 instead of through the casing 430.

As it is introduced, the cement slurry 60 may displace other fluids 436, such as drilling fluids and/or spacer fluids that may be present in the interior of the casing 430 and/or the wellbore annulus 432. At least a portion of the displaced fluids 436 may exit the wellbore annulus 432 via a flow line 438 and be deposited, for example, in one or more retention pits 440 (e.g., a mud pit), as shown on FIG. 5.

Referring again to FIG. 6, a bottom plug 444 may be introduced into the wellbore 422 ahead of the cement slurry 60, for example, to separate the cement slurry 60 from the fluids 436 that may be inside the casing 430 prior to cementing. After the bottom plug 444 reaches the landing collar 446, a diaphragm or other suitable device should rupture to allow the cement slurry 60 through the bottom plug 444. In FIG. 6, the bottom plug 444 is shown on the landing collar 446. In the illustrated embodiment, a top plug 448 may be introduced into the wellbore 422 behind the cement slurry 60. The top plug 448 may separate the cement slurry 60 from a displacement fluid 450 and also push the cement slurry 60 through the bottom plug 444.

Cement compositions 40 comprising mineral carbonation type cements, pozzolanic, and hydraulic (e.g., Portland) cements can be utilized to produce hardened cements 80 that lower the carbon footprint, sequester $CO_2$ 70, and simultaneously can be inherently highly chemical resistant and stronger after chemical attack than before.

The herein disclosed cement compositions 40, and cement slurries 60 produced therefrom, can assist in attaining carbon neutrality in the cementing process, and provide highly chemical resistant, low cost cements.

The cement slurry 60 can harden to form a hardened cement 80 having a strength (e.g., a compressive strength) and/or chemical resistance (e.g., a resistance to acid) that is greater than and/or a permeability that is less than an otherwise same hardened cement produced in the absence of the hydraulic cement material 10, the latent-hydraulic cement material 20, or the non-hydraulic cement material 30.

Other advantages will be apparent to those of skill in the art and with the help of this disclosure.

Example

The embodiments having been generally described, the following example is given as particular embodiments of the disclosure and to demonstrate the practice and advantages thereof. It is understood that the example is given by way of illustration and not intended to limit the specification or the claims in any manner.

Example 1

In this Example 1, a cement composition of this disclosure comprises 2000 lbs of calcium metasilicate, hardening to provide a hardened cement having about 757 lbs of $CO_2$ sequestered therein.

Additional Disclosure

The following are non-limiting, specific embodiments in accordance with the present disclosure:

In a first embodiment, a cement composition comprises: a hydraulic cement material; a latent-hydraulic cement material; and a non-hydraulic cement material.

A second embodiment can include the cement composition of the first embodiment, wherein the hydraulic cement material comprises Portland cement.

A third embodiment can include the cement composition of any one of the first or second embodiments, wherein the latent-hydraulic cement material comprises a pozzolanic material.

A fourth embodiment can include the cement composition of the third embodiment, wherein the pozzolanic material comprises a natural pozzolanic material chosen from volcanic materials (e.g., volcanic glasses), clays, zeolites, or diatomaceous earth, and/or an artificial pozzolan produced by: calcining of natural clay, shale, and/or siliceous rocks (e.g., metakaolin), burning of coal (e.g., fly ash), silicon metal production (e.g., silica fume), or steel production (e.g., granulated blast furnace slag).

A fifth embodiment can include the cement composition of any one of the first to fourth embodiments, wherein the non-hydraulic cement material comprises a mineral carbonation cement material.

A sixth embodiment can include the cement composition of the fifth embodiment, wherein the mineral carbonation cement material comprises a calcium metasilicate.

A seventh embodiment can include the cement composition of the sixth embodiment, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

An eighth embodiment can include the cement composition of any one of the first to seventh embodiments comprising from about 1 to about 98, from about 20 to about 80, or from about 40 to about 60 weight percent (wt %) of the hydraulic cement material, from about 1 to about 98, from about 10 to about 60, or from about 20 to about 40 wt % of the latent-hydraulic cement material, and/or from about 1 to about 98, from about 10 to about 60, or from about 20 to about 40 wt % of the non-hydraulic cement material, based on a total weight of the hydraulic cement material, the latent-hydraulic cement material, and the non-hydraulic cement material.

A ninth embodiment can include the cement composition of any one of the first to eighth embodiments further comprising one or more retarders, one or more accelerators, one or more support materials, one or more aggregates, viscosifiers, suspending aids, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof.

A tenth embodiment can include the cement composition of the ninth embodiment, wherein the latent-hydraulic cement material comprises a pozzolanic material, and wherein the one or more accelerators comprise calcium chloride ($CaCl_2$), sodium chloride (NaCl), sodium sulfate ($Na_2SO_4$), or a combination thereof.

In an eleventh embodiment, a cement slurry comprises the cement composition of any one of the first to tenth embodiments, and water.

In a twelfth embodiment, a method of producing a hardened cement at a jobsite comprises combining the cement composition of any one of the first to tenth embodiments with water to provide a cement slurry (e.g., forming the cement slurry of the eleventh embodiment) and allowing the cement slurry to harden in the presence of carbon dioxide ($CO_2$) to form the hardened cement, wherein the hardened cement has a strength (e.g., a compressive strength) and/or chemical resistance (e.g., a resistance to acid) that is greater than and/or a permeability that is less than an otherwise same cement produced in the absence of the hydraulic cement material, the latent-hydraulic cement material, or the non-hydraulic cement material.

A thirteenth embodiment can include the method of the twelfth embodiment, wherein the presence of the $CO_2$ is provided by (a) utilizing water comprising carbonated water produced with $CO_2$ produced at the jobsite, and combining the carbonated water and the cement composition to provide the cement slurry; and/or (b) combining $CO_2$ with the cement composition and the water to provide the cement slurry.

A fourteenth embodiment can include the method of the thirteenth embodiment, wherein the jobsite is a wellsite, and wherein the carbon dioxide is a component of an exhaust gas produced at the jobsite.

A fifteenth embodiment can include the method of the fourteenth embodiment, wherein the exhaust gas further comprises nitrogen ($N_2$), carbon monoxide (CO), hydrogen sulfide ($H_2S$), water vapor, hydrocarbons $C_xH_y$ (or "HC"), nitrogen oxides ($NO_x$), sulfur oxides (SOx) particulate matter (soot), or a combination thereof, and/or wherein the method further comprises separating the $CO_2$ from the exhaust gas.

In a sixteenth embodiment, a method can include: combining, at a jobsite, a cement composition comprising a hydraulic cement material, a latent-hydraulic cement material, and a non-hydraulic cement material with water to provide a cement slurry, and allowing the cement slurry to harden in the presence of carbon dioxide ($CO_2$) to provide a hardened cement.

A seventeenth embodiment can include the method of the sixteenth embodiment, wherein the hydraulic cement material comprises Portland cement, wherein the latent-hydraulic cement material comprises a pozzolanic material, and/or wherein the non-hydraulic cement material comprises a mineral carbonation cement material.

An eighteenth embodiment can include the method of any one of the sixteenth or seventeenth embodiments, wherein allowing the cement slurry to harden in the presence of carbon dioxide ($CO_2$) further comprises incorporating $CO_2$ into the cement slurry by combining $CO_2$ with the cement composition and the water to provide the cement slurry, carbonating the water by combining the water with $CO_2$ before combining the cement composition and the carbonated water to provide the cement slurry, and/or placing the cement composition at a location at which the cement composition is exposed to $CO_2$.

A nineteenth embodiment can include the method of the eighteenth embodiment, wherein the jobsite is a wellsite, and wherein the location is downhole.

A twentieth embodiment can include the method of any one of the sixteenth to nineteenth embodiments further comprising producing at least a portion of the $CO_2$ at the jobsite.

A twenty first embodiment can include the method of the twentieth embodiment, wherein the jobsite is a wellsite, and wherein producing at least a portion of the $CO_2$ at the jobsite comprises producing an exhaust gas comprising $CO_2$ via combustion.

A twenty second embodiment can include the method any one of the twentieth or twenty first embodiments further comprising separating the at least the portion of the $CO_2$ from the exhaust gas.

A twenty third embodiment can include the method of any one of the sixteenth to twenty second embodiments, wherein the jobsite is a wellsite, and wherein the method further comprises injecting the cement slurry downhole during a cementing operation at the wellsite, prior to allowing the cement slurry to harden in the presence of the carbon dioxide ($CO_2$) to provide the hardened cement.

A twenty fourth embodiment can include the method of the twenty third embodiment, wherein the cementing operation comprises a primary cementing operation, a remedial cementing operation (e.g., a squeeze cementing operation), a loss circulation operation, a plug and abandon operation, reverse cementing operations, or a combination thereof.

A twenty fifth embodiment can include the method of any one of the sixteenth to twenty fourth embodiments, wherein the hydraulic cement material comprises Portland cement, wherein the latent-hydraulic cement material comprises a pozzolanic material, and wherein an amount of the hydraulic cement material and an amount of the latent-hydraulic cement material are selected such that an amount of Portlandite ($Ca(OH)_2$) needed for reaction of the pozzolanic material is provided by the reaction of the hydraulic cement material.

A twenty sixth embodiment can include the method of the twenty fifth embodiment, wherein the non-hydraulic cement material comprises a mineral carbonation cement material.

A twenty seventh embodiment can include the method of the twenty sixth embodiment, wherein the mineral carbonation cement material comprises a calcium metasilicate.

A twenty eighth embodiment can include the method of the twenty seventh embodiment, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

A twenty ninth embodiment can include the method of any one of the sixteenth to twenty eighth embodiments, wherein the cement slurry shrinks by less than or equal to about 5, 4, 3, 2, 1, 0.5, or 0 volume percent (vol %) on hardening to provide the hardened cement.

In a thirtieth embodiment, a method of sequestering carbon dioxide ($CO_2$) comprises producing a gas comprising $CO_2$; separating $CO_2$ gas from the gas comprising $CO_2$; and providing a cement slurry comprising water, at least a portion of the $CO_2$ gas, and a cement composition comprising a hydraulic cement material, a latent-hydraulic cement material, and a non-hydraulic cement material, and allowing the cement slurry to harden to provide a hardened cement.

A thirty first embodiment can include the method of the thirtieth embodiment, wherein providing the cement slurry further comprises: combining the water and all or a portion of the at least the portion of the $CO_2$ gas to provide a carbonated water and combining the carbonated water with the cement composition to provide the cement slurry.

A thirty second embodiment can include the method of any one of the thirtieth or thirty first embodiments, wherein the gas comprising $CO_2$ comprises an exhaust gas produced at a wellsite.

A thirty third embodiment can include the method of the thirty second embodiment further comprising introducing the cement slurry downhole via a wellbore, and allowing the cement slurry to harden downhole to provide the hardened cement.

A thirty fourth embodiment can include the method of any one of the thirtieth to thirty third embodiments, wherein the hydraulic cement material comprises Portland cement and the latent-hydraulic cement material comprises a pozzolanic material.

A thirty fifth embodiment can include the method of the thirty fourth embodiment, wherein the pozzolanic material comprises a natural pozzolanic material chosen from volcanic materials (e.g., volcanic glasses), clays, zeolites, or diatomaceous earth, and/or an artificial pozzolan produced by: calcining of natural clay, shale, and/or siliceous rocks (e.g., metakaolin), burning of coal (e.g., fly ash), silicon metal production (e.g., silica fume), or steel production (e.g., granulated blast furnace slag).

A thirty sixth embodiment can include the method of any one of the thirtieth to thirty fifth embodiments, wherein the non-hydraulic cement material comprises a mineral carbonation cement material.

A thirty seventh embodiment can include the method of the thirty sixth embodiment, wherein the mineral carbonation cement material comprises a calcium metasilicate.

A thirty eighth embodiment can include the method of the thirty seventh embodiment, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of sequestering carbon dioxide ($CO_2$), the method comprising:
    producing a gas comprising $CO_2$;
    separating $CO_2$ gas from the gas comprising $CO_2$;
    preparing a cement slurry comprising water, at least a portion of the $CO_2$ gas, and a cement composition comprising a hydraulic cement material, a latent-hydraulic cement material, and a non-hydraulic cement material, wherein the cement composition from about 20 to about 80 weight percent (wt %) of the hydraulic cement material, from about 10 to about 60 wt % of the latent-hydraulic cement material, and from about 10 to about 60 wt % of the non-hydraulic cement material, based on a total weight of the hydraulic cement material, the latent-hydraulic cement material, and the non-hydraulic cement material;
    placing the cement slurry downhole via a wellbore; and
    allowing the cement slurry to harden to provide a hardened cement.

2. The method of claim 1, wherein preparing the cement slurry further comprises: combining the water and at least some of the at least the portion of the $CO_2$ gas to provide a carbonated water and combining the carbonated water with the cement composition to provide the cement slurry.

3. The method of claim 2, wherein the gas comprising $CO_2$ comprises an exhaust gas produced at a wellsite.

4. The method of claim 3, wherein the hydraulic cement material comprises Portland cement and the latent-hydraulic cement material comprises a pozzolanic material.

5. The method of claim 4, wherein the pozzolanic material comprises a natural pozzolanic material chosen from volcanic materials, clays, zeolites, or diatomaceous earth, an artificial pozzolan produced by: calcining of natural clay, shale, and/or siliceous rocks, burning of coal, silicon metal production, or steel production, or a combination thereof.

6. The method of claim 5, wherein the non-hydraulic cement material comprises a mineral carbonation cement material.

7. The method of claim 6, wherein the mineral carbonation cement material comprises a calcium metasilicate.

8. The method of claim 7, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

9. The method of claim 1, wherein the gas comprising $CO_2$ comprises an exhaust gas produced at a wellsite.

10. The method of claim 9, wherein the hydraulic cement material comprises Portland cement and the latent-hydraulic cement material comprises a pozzolanic material.

11. The method of claim 10, wherein the pozzolanic material comprises a natural pozzolanic material chosen from volcanic materials, clays, zeolites, or diatomaceous earth, an artificial pozzolan produced by: calcining of natural clay, shale, and/or siliceous rocks, burning of coal, silicon metal production, or steel production, or a combination thereof.

12. The method of claim 11, wherein the non-hydraulic cement material comprises a mineral carbonation cement material.

13. The method of claim 12, wherein the mineral carbonation cement material comprises a calcium metasilicate.

14. The method of claim 13, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

15. The method of claim 14, wherein the cement slurry shrinks by less than or equal to about 5 volume percent (vol %) on hardening to provide the hardened cement.

16. The method of claim 1, wherein the hydraulic cement material comprises Portland cement and the latent-hydraulic cement material comprises a pozzolanic material.

17. The method of claim 16, wherein the pozzolanic material comprises a natural pozzolanic material chosen from volcanic materials, clays, zeolites, or diatomaceous earth, an artificial pozzolan produced by: calcining of natural clay, shale, and/or siliceous rocks, burning of coal, silicon metal production, or steel production, or a combination thereof.

18. The method of claim 17, wherein the non-hydraulic cement material comprises a mineral carbonation cement material.

19. The method of claim 18, wherein the mineral carbonation cement material comprises a calcium metasilicate.

20. The method of claim 19, wherein the calcium metasilicate comprises wollastonite ($CaSiO_3$), parawollastonite ($CaSiO_3$), pseudowollastonite ($Ca_3Si_3O_9$), rankinite ($Ca_3Si_2O_7$), or a combination thereof.

* * * * *